(12) United States Patent
Sawazaki

(10) Patent No.: US 11,256,550 B2
(45) Date of Patent: Feb. 22, 2022

(54) ESTIMATING DEVICE AND ESTIMATING METHOD

(71) Applicant: Nippon Telegraph and Telephone Corporation, Tokyo (JP)

(72) Inventor: Fumihiko Sawazaki, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 42 days.

(21) Appl. No.: 16/975,509

(22) PCT Filed: Feb. 25, 2019

(86) PCT No.: PCT/JP2019/006968
§ 371 (c)(1),
(2) Date: Aug. 25, 2020

(87) PCT Pub. No.: WO2019/167859
PCT Pub. Date: Sep. 6, 2019

(65) Prior Publication Data
US 2021/0034428 A1    Feb. 4, 2021

(30) Foreign Application Priority Data
Feb. 27, 2018    (JP) .............................. JP2018-033798

(51) Int. Cl.
*G06F 9/50*    (2006.01)
*G06F 9/38*    (2018.01)
(52) U.S. Cl.
CPC .......... *G06F 9/5072* (2013.01); *G06F 9/3877* (2013.01); *G06F 9/505* (2013.01); *G06F 9/5038* (2013.01)

(58) Field of Classification Search
CPC ..................................................... G06F 9/5027
See application file for complete search history.

(56) References Cited

U.S. PATENT DOCUMENTS

| | | | | |
|---|---|---|---|---|
| 2008/0015769 A1* | 1/2008 | Hirooka | ................. | B60T 17/02 701/101 |
| 2011/0131579 A1* | 6/2011 | Tsukamoto | ............ | G06Q 40/04 718/101 |

FOREIGN PATENT DOCUMENTS

JP    2008-171235    7/2008

OTHER PUBLICATIONS

Dpdk.org, [online], "Developer Quick Start Guide—Learn How to Get Involved With DPDK," 2020, retrieved on Jul. 16, 2020, retrieved from URL<https://www.dpdk.org/>, 4 pages.

(Continued)

*Primary Examiner* — Charlie Sun
(74) *Attorney, Agent, or Firm* — Fish & Richardson P.C.

(57) ABSTRACT

An estimation device is capable of estimating the number of CPU cores allocated to modules of an information processing device, which employs a micro-service architecture, and performance. A number-of-cores calculation unit calculates the total number of CPU cores necessary to process a temporary processing performance value output by a performance calculation unit. The performance calculation unit causes the number-of-cores calculation unit to calculate the number of necessary CPU cores while repeatedly adding a processing performance value increment to the temporary processing performance, and obtains an upper limit value of processing performance that is a maximum temporary processing performance value not exceeding a predetermined upper limit number of allocable CPU cores.

6 Claims, 6 Drawing Sheets

(56) References Cited

OTHER PUBLICATIONS

Nakamura et al., "Magonia (SPP): High-speed interfunction technology," NTT Technical Journal, 2016, 14(8):31-33, 7 pages (with English Translation).

* cited by examiner

| MODULE | M_A | M_B | M_C | M_D | M_E | M_F |
|---|---|---|---|---|---|---|
| UNIT PROCESSING AMOUNT | 2000 | 1000 | 1000 | 500 | 200 | 2000 |

Fig. 4

| TRAFFIC AMOUNT | NUMBER OF NECESSARY MODULE INSTANCES (NUMBER OF NECESSARY CPU CORES) | | | | | | TOTAL NUMBER OF MODULE INSTANCES |
|---|---|---|---|---|---|---|---|
| | M_A | M_B | M_C | M_D | M_E | M_F | |
| 200 | 1 | 1 | 1 | 1 | 1 | 1 | 6 |
| 400 | 1 | 1 | 1 | 1 | 2 | 1 | 7 |
| 600 | 1 | 1 | 1 | 2 | 3 | 1 | 9 |
| 800 | 1 | 1 | 1 | 2 | 4 | 1 | 10 |
| 1000 | 1 | 1 | 1 | 2 | 5 | 1 | 11 |
| 1200 | 1 | 2 | 2 | 3 | 6 | 1 | 15 |
| 1400 | 1 | 2 | 2 | 3 | 7 | 1 | 16 |
| 1600 | 1 | 2 | 2 | 4 | 8 | 1 | 18 |
| 1800 | 1 | 2 | 2 | 4 | 9 | 1 | 19 |
| 2000 | 1 | 2 | 2 | 4 | 10 | 1 | 20 |
| 2200 | 2 | 3 | 3 | 5 | 11 | 2 | 26 |

ESTIMATING DEVICE AND ESTIMATING METHOD

CROSS-REFERENCE TO RELATED APPLICATIONS

This application is a National Stage application under 35 U.S.C. § 371 of International Application No. PCT/JP2019/006968, having an International Filing Date of Feb. 25, 2019, which claims priority to Japanese Application Serial No. 2018-033798, filed on Feb. 27, 2018. The disclosure of the prior application is considered part of the disclosure of this application, and is incorporated in its entirety into this application

TECHNICAL FIELD

The present invention relates to an estimation device and an estimation method for estimating the number of CPU (Central Processing Unit) cores assigned to a plurality of modules in an information processing device and a processing performance value.

BACKGROUND ART

Conventionally, a transfer service function in a carrier has been realized by dedicated hardware corresponding to the function, and the function and the hardware have been integrated. Thus, even when the use rate of hardware of a certain function is low, the hardware is not made available to another function, leading to inefficiency. In order to solve such a problem, network functions virtualization has come into wide use in which a plurality of virtual machines are operated on a general-purpose physical server, the virtual machines realize a function as needed, and thus a service is provided.

As a method of connecting the plurality of virtual machines which are operated on one general-purpose physical server, as disclosed in Non-Patent Literature 1, there is a method of using standard software called OvS (Open vSwitch) which is a virtual switch. In addition, there is a method in which a physical NIC (Network Interface Card) can directly access the virtual machines using a technique called SR-IOV (Single Root I/O Virtualization) to realize software switching processing with hardware.

Independently of a transport device using OvS or SR-IOV, a transport device appears in which modules for realizing a function are allocated to be exclusively used by CPU cores and the plurality of modules sequentially processes IP (Internet Protocol) packets. A form, in which such a plurality of modules are combined to realize one service (device), is called a micro-service architecture. In the transport device, when a module having a high processing load is present in the plurality of modules, such a module serves as a bottleneck, resulting in reducing the overall processing performance.

In such a case, the bottleneck can be eliminated when the plurality of CPU cores are allocated to the module having a high processing load to improve processing capability of the module, and thus the processing performance as the transport device can be improved. By allocating an appropriate number of CPU cores to each module and reducing available processing capability of the CPU cores, hardware resource can be used without waste.

Hereinafter, a module allocated with CPU cores is also referred to as a module instance. In the micro-service architecture, for a module with a heavy processing load, a plurality of module instances are generated and processed, thereby accelerating the entire processing and improving a use rate of a resource.

FIG. 7 is a diagram illustrating a module configuration of a transport device 201 employing a micro-service architecture according to the related art. The transport device 201 includes a module A, a module B, a module C, and a module D which have different functions, respectively. The module A is allocated with a single exclusive CPU core to process an IP packet as a module instance A (indicated by M_A in FIG. 7) 211A. Similarly, the module B, the module C, and the module D are allocated with a single exclusive CPU core, two exclusive CPU cores, and a single exclusive CPU core, respectively, and a module instance B (indicated by M_B in FIG. 7) 211B, module instances C (indicated by M_C in FIG. 7) 211C1 and 211C2, and a module instance D (indicated by M_D in FIG. 7) 211D realize respective functions and process IP packets.

A module (function) with a high load is allocated with a plurality of cores to generate and process a plurality of module instances, thereby a load can be dispersed and such a module can be prevented from becoming a bottleneck in the entire processing.

A memory buffer (indicated by B in FIG. 7) 221A is interposed between the module instance A 211A and the module instance B 211B, and stores an IP packet processed by the module instance A 211A. Subsequently, the module instance B 211B extracts the IP packet from the memory buffer 221A and processes the extracted IP packet. The same also applies to a memory buffer 221B1 interposed between the module instance B 211B and the module instance C 211C1 and a memory buffer 221B2 interposed between the module instance B 211B and the module instance C 211C2. The same also applies to a memory buffer 221C1 interposed between the module instance C 211C1 and the module instance D 211D and a memory buffer 221C2 interposed between the module instance C 211C2 and the module instance D 211D. A technique called DPDK (Data Plane Development Kit) (see Non-Patent Literature 2) is used for operating IP packets on a physical NIC and a memory.

In this way, the module instances having exclusively the core process the IP packets in sequence via the memory buffer, thereby enabling high-speed relay processing and header editing processing. In addition, the module for realizing a high-load function is allocated with a plurality of cores and processes a plurality of module instances, thereby enabling IP packets to process in parallel and enabling processing performance equivalent to that of another module to realize.

CITATION LIST

Non-Patent Literature

Non-Patent Literature 1: Tetsuro Nakamura, et al., 3 persons, MAGONIA (SPP): High-Speed Inter-function Technique, NTT Technical Journal, 2016.8, pp. 31-33, [online], [Searched on Feb. 14, 2018], Internet <URL:http://www.ntt.co.jp/journal/1608/files/jn20160831.p df>

Non-Patent Literature 2: DPDK, [online], [Searched on Feb. 14, 2018], Internet <URL:http://dpdk.org/>

SUMMARY OF THE INVENTION

Technical Problem

Software of a conventional transport device can be made in a form of a monolithic type. Thus, the transport device is regarded as one module, and an upper limit of a processable traffic is determined from an input traffic to the transport device and a use rate of a resource to obtain a performance value. On the other hand, in the transport device employing the micro-service architecture, the configuration of the module can be changed according to processing contents, and the number of module instances for one module (the number of CPU cores allocated to the module) can be increased or decreased. For this reason, an estimation method different from a method of estimating the performance value in the monolithic transport device according to the related art is required. Further, a method is required to estimate the number of module instances required for processing of the amount of traffics to be expected.

The estimation for the device employing such a micro-service architecture is required not only for the transport device but also for other information processing devices.

The present invention has been made in view of such circumstances, and the present invention provides an estimation device and an estimation method capable of, in an information processing device including a plurality of modules, estimating the number of CPU cores allocated to the modules and a processing performance value.

Means for Solving the Problem

In order to solve the above-described problems, the invention according to claim 1 provides an estimation device that estimates an upper limit value of processing performance indicating an upper limit of a processing performance value of an information processing device including a plurality of modules, the estimation device including: a storage unit that stores a unit processing performance value for each of the modules indicating the processing performance value when one CPU (Central Processing Unit) core is allocated to each of the modules, an initial processing performance value indicating a minimum estimated value of the processing performance value, and a predetermined upper limit number of allocable CPU cores; a number-of-cores calculation unit that calculates a temporary processing performance value by adding a processing performance value increment indicating an increment of predetermined processing performance to the initial processing performance value, calculates the number of necessary CPU cores, which indicates the number of CPU cores necessary to satisfy the temporary processing performance value, for each of the modules using the calculated temporary processing performance value and the unit processing performance value, and calculates the total number of necessary CPU cores, which is calculated for each of the modules, as the total number of allocated CPU cores; and a performance calculation unit that executes determination as to whether the calculated total number of allocated CPU cores exceeds the upper limit number of allocable CPU cores whenever the processing performance value increment is repeatedly added to the temporary processing performance value, and calculates, as the upper limit value of processing performance, the maximum temporary processing performance value at which the calculated total number of allocated CPU cores does not exceed the upper limit number of allocable CPU cores.

The invention according to claim 4 provides an estimation method for an estimation device that estimates an upper limit value of processing performance indicating an upper limit of a processing performance value of an information processing device including a plurality of modules, the estimation method including steps, which are executed by the estimation device, of: storing a unit processing performance value for each of the modules indicating the processing performance value when one CPU core is allocated to each of the modules, an initial processing performance value indicating a minimum estimated value of the processing performance value, and a predetermined upper limit number of allocable CPU cores; calculating a temporary processing performance value by adding a processing performance value increment indicating an increment of predetermined processing performance to the initial processing performance value, calculating a number of necessary CPU cores, which indicates a number of CPU cores necessary to satisfy the temporary processing performance value, for each of the modules using the calculated temporary processing performance value and the unit processing performance value, and calculating the total number of necessary CPU cores, which is calculated for each of the modules, as the total number of allocated CPU cores; and executing determination as to whether the calculated total number of allocated CPU cores exceeds the upper limit number of allocable CPU cores whenever the processing performance value increment is repeatedly added to the temporary processing performance value, and calculating, as the upper limit value of processing performance, the maximum temporary processing performance value in which the calculated total number of allocated CPU cores does not exceed the upper limit number of allocable CPU cores.

With such a configuration, the estimation device can calculate the upper limit value of the processing performance that can be processed by the cores equal to or less than the upper limit number of allocable CPU cores.

The invention according to claim 2 is the estimation device according to claim 1 in which the performance calculation unit calculates the number of necessary CPU cores satisfying the upper limit value of processing performance for each of the modules using the upper limit value of processing performance and the unit processing performance value, and sets the calculated number of necessary CPU cores as a number of CPU cores allocated to each of the modules.

With such a configuration, the estimation device can calculate the total number of CPU cores necessary for processing of the upper limit value of processing performance for each module.

The invention according to claim 3 is the estimation device according to claim 1 or 2 in which the information processing device is an information processing device that processes communication data, and the processing performance value indicates a number of the communication data to be processed per unit time.

With such a configuration, the estimation device can calculate the upper limit value of the number pieces of communication data that can be processed by the cores equal to or less than the upper limit number of allocable CPU cores. In addition, the total number of CPU cores necessary for processing of the upper limit value can be output for each module.

Effects of the Invention

According to the present invention, it is possible to provide an estimation device and an estimation method capable of, in an information processing device including a plurality of modules, estimating the number of CPU cores allocated to the modules and a processing performance value.

BRIEF DESCRIPTION OF DRAWINGS

FIG. 4 is a diagram for explaining estimation processing to be executed by the estimation device according to the present embodiment.

DESCRIPTION OF EMBODIMENT

In the following, after an overview of a method of estimating the number of module instances (the number of CPU cores allocated to modules) and a processing performance value of a transport device, an estimation device (see FIG. 5 to be described below) according to an embodiment of the present invention will be described.

<<Overview of Estimation Method>>

Figures 1, 2:
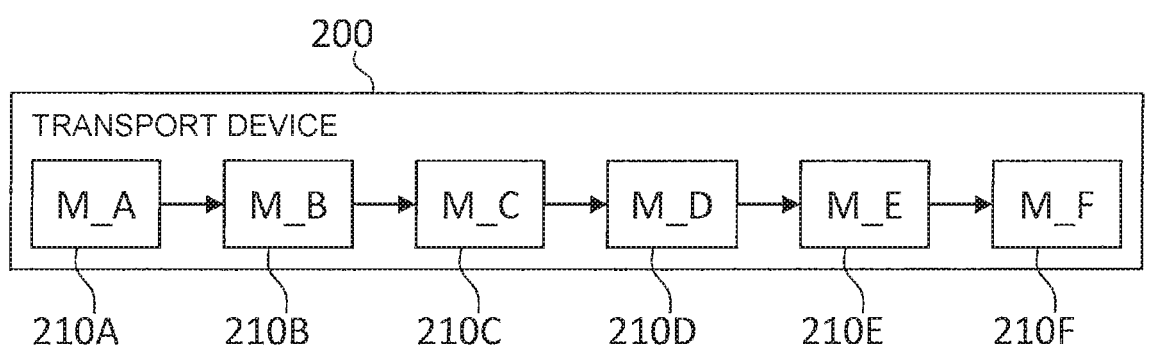
FIG. 1 is a diagram illustrating a configuration of modules of a transport device for which an estimation device according to the present embodiment estimates performance and the number of module instances.
FIG. 2 is a diagram illustrating a data configuration of a module performance table indicating a unit processing amount of the module instances according to the present embodiment.
Figure 7:
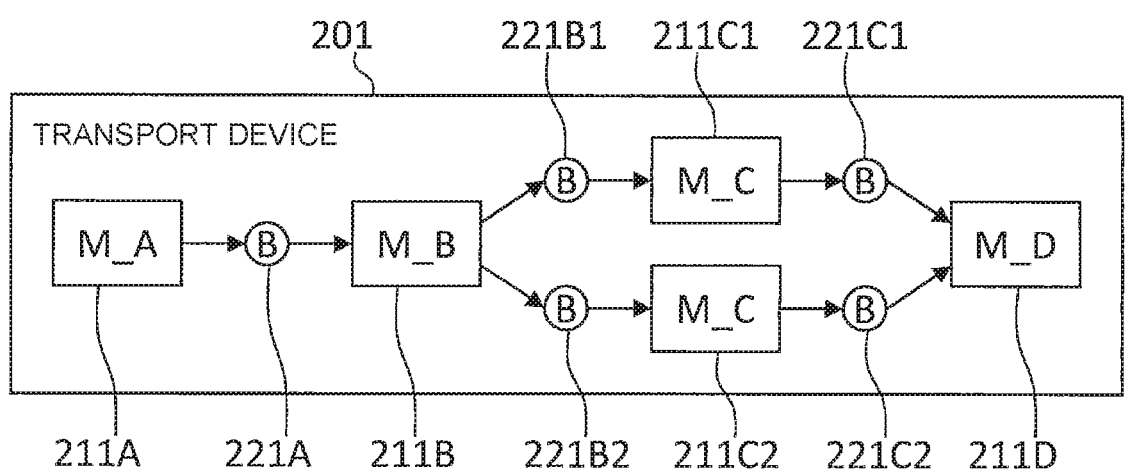
FIG. 7 is a diagram for explaining a configuration of modules of a transport device employing a micro-service architecture according to the related art.

FIG. 1 is a diagram illustrating a module configuration of a transport device 200 for which an estimation device according to the present embodiment estimates a processing performance value and the number of module instances. The transport device 200 includes six modules, for example, a module A 210A, a module B 210B, a module C 210C, a module D 210D, a module E 210E, a module F 210F, and sequentially processes IP packets. In addition, a memory buffer (see FIG. 7) existing between the modules is omitted.

FIG. 2 is a diagram illustrating data configuration of module performance table 121 indicating a unit processing amount of the module instances according to the present embodiment. The unit processing amount indicates a processing performance value when one CPU core is allocated to a module. The module performance table 121 is tabular data in which the module is stored in association with the unit processing amount of the module instances (also referred to as a unit processing performance value, a module unit processing amount, or a unit processing amount of the module). The module unit processing amount indicates an amount of IP packets that can be processed per unit time by a module allocated with one core, and the unit is, for example, kpps (kilo packets per second).

According to the module performance table 121, the unit processing amount of the module A 210A is 2000 kpps while the unit processing amount of the module E 210E is 200 kpps. The unit processing amount of the module can be measured by allocating one core to the module and actually measuring an upper limit value of a processable traffic.

Figure 3:
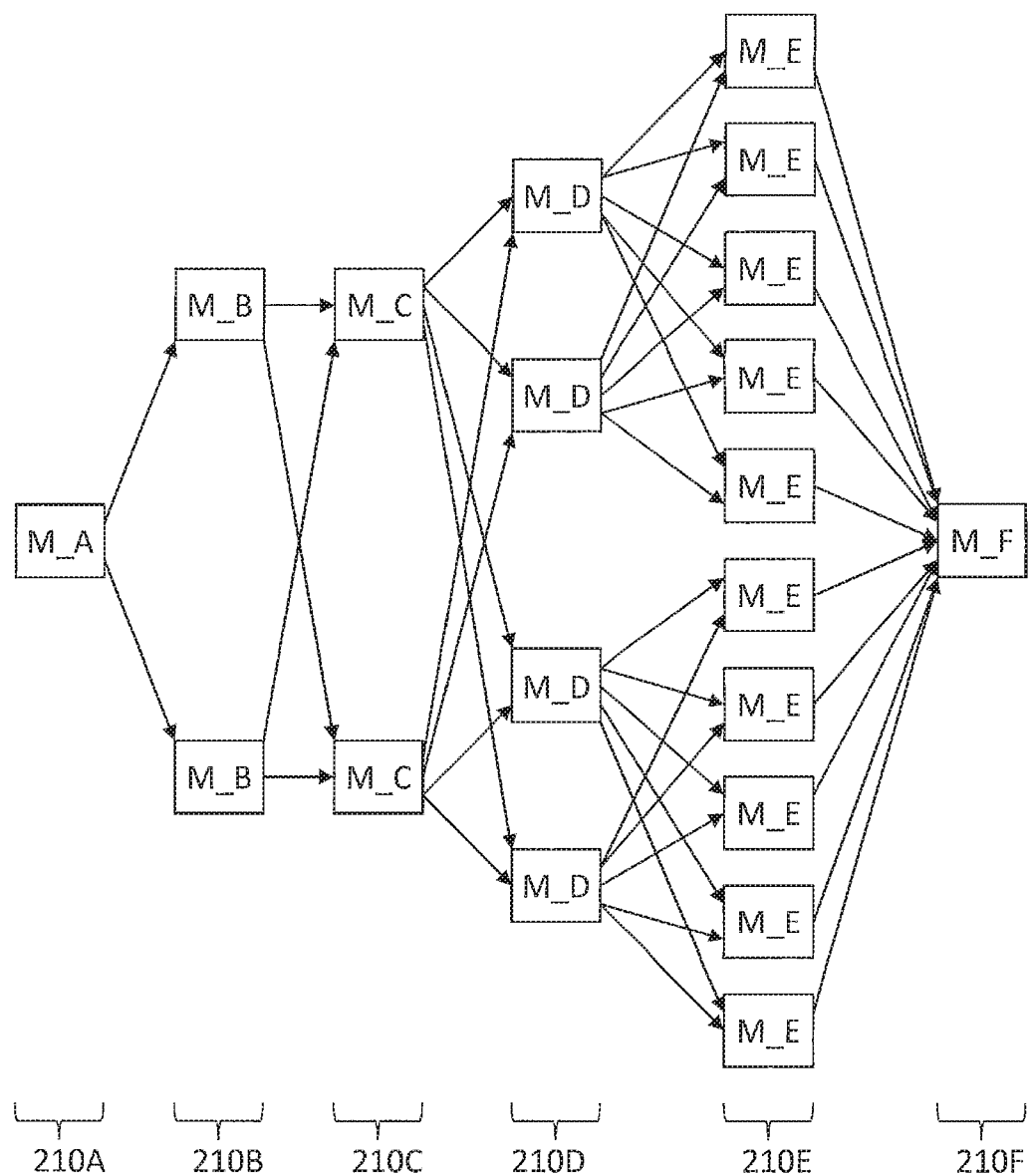
FIG. 3 is a diagram illustrating a configuration of the modules according to the present embodiment.

FIG. 3 is a diagram illustrating a module configuration according to the present embodiment. In an example of the module configuration (configuration of module instance) shown in FIG. 3, the numbers of instances of module A 210A, module B 210B, module C 210C, module D 210D, module E 210E and module F 210F are one, two, two, four, ten, and one, respectively. With such a module configuration, all modules can process 2000 kpps of traffic. Therefore, the transport device 200 (see FIG. 1) can process 2000 kpps of traffic without any module creating a bottleneck.

FIG. 4 is a diagram for explaining estimation processing to be executed by the estimation device 100 according to the present embodiment. In the estimation processing, an upper limit of the number (the upper limit number of allocable CPU cores) of available module instances (the number of allocable cores to be described below) is determined, and the maximum value of the traffic amount, which can be processed below such a maximum value, is obtained. In the following description, it is assumed that the upper limit is 20.

The estimation device 100 sets an initial value of the traffic amount (initial processing performance value) to 200 kpps, and obtains the total number of module instances necessary for the transport device 200 to process the traffic amount. The total number of necessary module instances can be calculated by obtaining the number of module instances (the number of necessary CPU cores and the number of cores) necessary to process the traffic for each module and then calculating the sum. For example, when the traffic amount is 200 kpps, since the unit processing amount of each of the module A 210A to the module F 210F is equal to and more than 200 kpps (see FIG. 2), each of the modules can process the traffic with one module instance and thus the total number of the module instances is 6 (see a row in which the traffic amount is 200 in FIG. 4).

Since the upper limit of the number of module instances is 20, it is considered that more traffic can be processed. When the estimation device 100 increases the traffic amount by 200 kpps and sets it to 400 kpps, and the total number of the module instance becomes 7 in the same calculation manner (see a row in which the traffic amount is 400 in FIG. 4).

When the traffic amount is set to 600 kpps by increasing by 200 kpps and the estimation device 100 calculates in the same manner, the total number of the module instances becomes 9 (see a row in which the traffic amount is 600 in FIG. 4). In addition, the unit processing amount of the module D 210D is 500 kpps, two module instances are required to process 600 kpps. The number of the module instances is obtained by dividing the traffic amount by the unit processing amount (unit processing performance value) and rounding up below decimal point of the divided value.

Subsequently, the estimation device 100 repeats the calculation while increasing the traffic amount by 200 kpps until the number of the module instances required for processing the traffic exceeds 20.

The total number of the module instances required for processing the traffic amount of 2000 kpps is 20 (see a raw in which the traffic amount is 2000 in FIG. 4). Since the total number of the module instances does not exceed the upper limit of 20, the estimation device 100 increases the traffic amount by 200 kpps to calculate the total number of the module instances in a case where the traffic amount is 2200 kpps. The total number of module instances required for processing the traffic of 2200 kpps is 26 (see a row in which the traffic amount is 2200 in FIG. 4), the total number of module instances exceeds the upper limit of 20. The estimation device 100 then determines that the processing is impossible, and calculates that 2000 kpps is the upper limit of the processable traffic amount. Finally, the estimation device 100 calculates, for each module, the number of module instances which is required for processing the traffic of 2000 kpps.

According to the processing described above, the estimation device 100 can obtain a fact that the upper limit of the processable traffic amount is 2000 kpps when the upper limit of the total number of module instances (upper limit number of allocable CPU cores) is 20, and then calculate the number of module instances for each module.

<<Overall Configuration of Estimation Device>>

Figure 5:
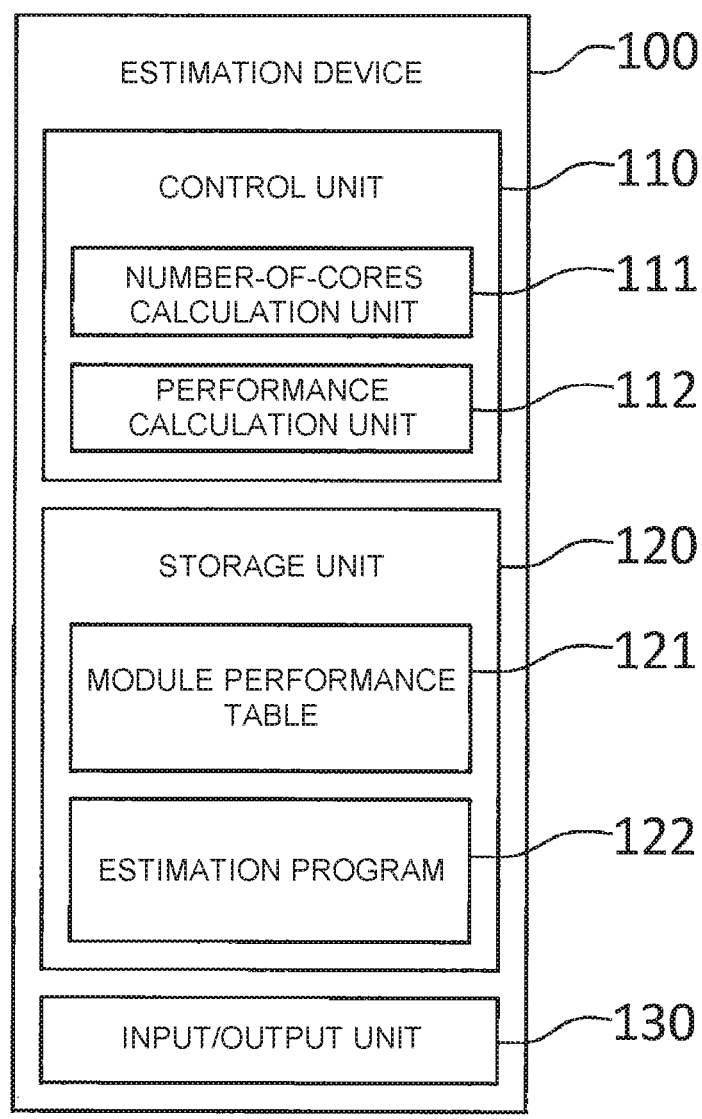
FIG. 5 is a diagram illustrating an overall configuration of the estimation device according to the present embodiment.

FIG. 5 is a diagram illustrating an overall configuration of the estimation device 100 according to the present embodiment. The estimation device 100 includes a control unit 110, a storage unit 120, and an input/output unit 130. The control unit 110 is configured by CPU and executes estimation processing by storing an estimation program 122 to be described below, into the storage unit 120 and executing the estimation program. The control unit 110 includes a number-of-cores calculation unit 111 and a performance calculation unit 112.

The number-of-cores calculation unit 111 calculates the number of instances for each module (also referred to the number of cores allocated to the module, the number of allocated cores, the number of allocated CPU cores, and the number of necessary CPU cores) required for processing a given traffic amount and the total number of instances (the total number of allocated CPU cores).

The performance calculation unit 112 calculates an upper limit (an upper limit value of processing performance) of the processable traffic amount (processing performance value) from the number of allocable core input by input/output unit 130 described later. Furthermore, the performance calculation unit 112 calculates the number of instances for each module required for processing the upper limit value of processing performance (the number of necessary CPU cores).

The storage unit 120 includes, for example, a RAM (Random Access Memory), a ROM (Read Only Memory), an HDD (Hard Disk Drive), and a flash memory, and stores a module performance table 121, the estimation program 122, OS (Operating System) (not shown), and data required during the estimation processing.

The module performance table 121 (see FIG. 2) stores the unit processing amount of each module. In FIG. 2, Data is tabular form, but not limited to, data may be another form. A name and the number of modules, and the unit processing amount is input from outside of the estimation device 100 via the input/output unit 130 to be described below.

The estimation program 122 is a program for executing estimation processing.

The input/output unit 130 executes data input/output from/to the outside of the estimation device 100, and includes, for example, devices such as a keyboard, a display, and a NIC. Data for estimation processing is input from the keyboard, or is input as communication data received by the NIC, the data being the unit processing amount of module stored in the module performance table 121 or the number of the allocable CPU core described later. Furthermore, the number of instances of each module (the number of the allocated core) is obtained as the processing result of estimation processing and is output as display data on the display or communication data transmitted by the NIC.

<<Estimation Processing>>

Figure 6:
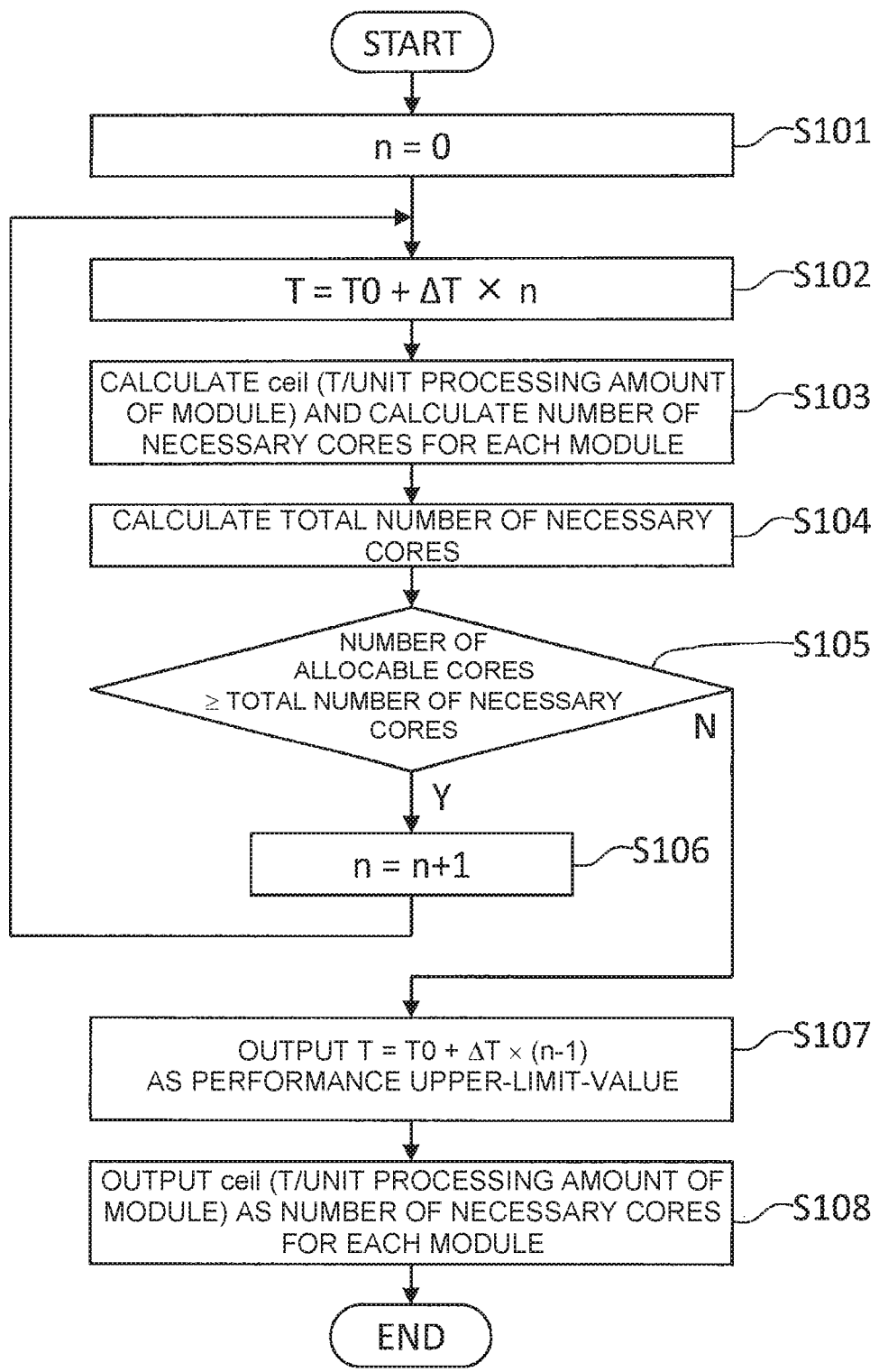
FIG. 6 is a flowchart of the estimation processing according to the present embodiment.

FIG. 6 is a flowchart of estimation processing according to the present embodiment. The estimation processing to be executed by the control unit 110 will be described with reference to FIG. 6. Input data of the estimation processing includes module names, a unit processing amount for each the modules, the number of allocable cores to be described below, performance estimation accuracy (processing performance value increment) to be described below, and an initial processing performance value to be described below. The input data is input from the input/output unit 130, and is stored in the storage unit 120. The module names and the unit processing amounts of the respective modules are stored in the module performance table 121.

The number of allocable cores (upper limit number of allocable CPU cores) is an upper limit of the number of cores that can be allocated to the modules (20 in the description of FIG. 4). In the estimation processing, the maximum value of the processable traffic amount equal to and smaller than the number of allocable cores is calculated. Hereinafter, such a maximum value is also referred to as a performance upper-limit-value in the number of allocable cores or simply referred to as a performance upper-limit-value (upper limit value of processing performance).

The performance estimation accuracy (processing performance value increment) is an allowable value of an error when the performance upper-limit-value is calculated. The performance estimation accuracy is equivalent to 200 kpps of the increment in the traffic amount in the repetitive processing described in FIG. 4, and is accuracy for obtaining the performance upper-limit-value.

The initial processing performance value is an initial value of the processing performance value, and is a minimum value of the estimated value of the processing performance value. For example, the initial processing performance value is a minimum unit processing amount among the unit processing amounts of the plurality of modules.

Output data of the estimation processing includes a performance upper-limit-value of the number of allocated cores (the number of module instances) and the number of allocable cores for each of the modules. The output data is output via the input/output unit 130.

Respective steps shown in FIG. 6 will be described below. A ceil function, which is also called a ceiling function, is a function for obtaining the least integer equal to or greater than an argument. When the argument is positive, the ceil function is a rounding-up function of the decimal point. For example, ceil(1.5)=2, and ceil(3)=3.

The performance estimation accuracy (200 kpps in FIG. 4) of the input data is defined as ΔT. The initial processing performance value (200 kpps in FIG. 4) is defined as T0. The symbol T is a variable of the processing performance value (temporary processing performance value).

In step S101, the performance calculation unit 112 sets an integer variable of n to 0.

In step S102, the performance calculation unit 112 sets as T=T0+ΔT×n. The variable T increases by 200 kpps from an initial value (initial processing performance value) of 200 kpps.

In step S103, the number-of-cores calculation unit 111 calculates ceil (T/unit processing amount of module) for each module, thereby calculating the number of cores (the number of module instances, the number of allocated CPU cores, the number of necessary CPU cores, or the number of necessary cores) necessary for processing of the traffic amount of the processing performance value T. For example, when T is 600 kpps, the number of necessary cores of the module D210D (the unit processing amount is 500 kpps as shown in FIG. 2) is 2 (see a row where the traffic amount is 600 in FIG. 4).

In step S104, the number-of-cores calculation unit 111 calculates the total of the number of necessary cores for each module calculated in step S103, and calculates the total number of necessary cores (the total number of module instances, the total number of allocated CPU cores, and the total number of module instances in FIG. 4).

In step S105, the performance calculation unit 112 determines whether the number of allocable cores, which is the input data, is equal to or greater than the total number of necessary cores calculated in step S104. When the number of allocable cores is equal to or greater than the total number of necessary cores (step S105: Y), the process proceeds to step S106; otherwise (step S105: N), the process proceeds to step S107.

In step S106, the performance calculation unit 112 adds 1 to the integer variable of n, and the process returns to step S102.

In step S107, the performance calculation unit 112 outputs $T=T0+\Delta T \times (n-1)$ as the performance upper-limit-value. In FIG. 4, the performance upper-limit-value is 2000 kpps.

In step S108, the performance calculation unit 112 outputs the ceil (T/unit processing amount of module) as the number of necessary cores for each module. In FIG. 4, the module A 210A to module F 210F have the number of necessary cores of 1, 2, 2, 4, 10, and 1, respectively (see a row where the traffic amount is 2000 in FIG. 4).

<<Features of Estimation Processing>>

In steps S103 to S104, the number-of-cores calculation unit 111 the number of cores (the number of module instances and the number of allocated CPU cores) for each module and the total number of cores (the total number of module instances and the total number of allocated CPU cores) which are necessary for processing of the traffic amount (the temporary processing performance value) T calculated by the performance calculation unit 112.

In steps S102, S105, and S106, the performance calculation unit 112 adds the traffic amount T by $\Delta T$ from the initial value (initial processing performance value) until when the total number of necessary cores calculated by the number-of-cores calculation unit 111 exceeds the number of allocable cores (upper limit number of allocable CPU cores). Subsequently, in steps S107 and S108, the performance calculation unit 112 outputs the traffic amount T immediately before the total number of necessary cores exceeds the number of allocable cores as the performance upper-limit-value (upper limit value of processing performance), and outputs the number of necessary cores (number of allocated CPU cores) for each module with respect to T.

<<Effects of Estimation Processing>>

When the estimation device 100 executes the estimation processing, the performance value (the processable traffic amount) of the transport device having the micro-service architecture can be estimated. Further, the number of module instances (the number of allocated cores) necessary for processing can be estimated for each module, and the number of module instances in an optimal module configuration can be estimated. As a result, provisioning of the transport device becomes possible.

<<Modification: Information Processing Device>>

The estimation device 100 is intended for estimating the transport device of the micro-service architecture. However, the estimation device 100 can be applied not only the transport device but also to an information processing device having a module configuration in which processing modules are independent and processing amount increases in proportion to the number of cores allocated to the modules. In this case, the estimation device 100 can calculate the performance upper-limit-value of the information processing device and the number of allocated cores (the number of module instances and the number of allocated CPU cores) for each module.

REFERENCE SIGNS LIST

100 Estimation device
110 Control unit
111 Number-of-cores calculation unit
112 Performance calculation unit
120 Storage unit
121 Module performance table
122 Estimation program
130 Input/output unit

The invention claimed is:

1. An estimation device that estimates an upper limit value of processing performance indicating an upper limit of a processing performance value of an information processing device including a plurality of modules, the estimation device comprising:

a storage unit that stores a unit processing performance value for each of the modules indicating the processing performance value when one CPU (Central Processing Unit) core is allocated to each of the modules, an initial processing performance value indicating a minimum estimated value of the processing performance value, and a predetermined upper limit number of allocable CPU cores;

a number-of-cores calculation unit, including one or more processors, that calculates a temporary processing performance value by adding a processing performance value increment indicating an increment of predetermined processing performance to the initial processing performance value, calculates a number of necessary CPU cores, which indicates the number of CPU cores necessary to satisfy the temporary processing performance value, for each of the modules using the calculated temporary processing performance value and the unit processing performance value, and calculates the total number of necessary CPU cores, which is calculated for each of the modules, as a total number of allocated CPU cores; and a performance calculation unit, including one or more processors, that executes determination as to whether the calculated total number of allocated CPU cores exceeds the predetermined upper limit number of allocable CPU cores whenever the processing performance value increment is repeatedly added to the temporary processing performance value, and calculates, as the upper limit value of processing performance, the maximum temporary processing performance value in which the calculated total number of allocated CPU cores does not exceed the predetermined upper limit number of allocable CPU cores.

2. The estimation device according to claim 1, wherein the performance calculation unit calculates the number of necessary CPU cores satisfying the upper limit value of processing performance for each of the modules using the upper limit value of processing performance and the unit processing performance value, and sets the calculated number of necessary CPU cores as the number of CPU cores allocated to each of the modules.

3. The estimation device according to claim 1, wherein the information processing device is an information processing device that processes communication data, and the processing performance value indicates a number of the communication data to be processed per unit time.

4. An estimation method for an estimation device that estimates an upper limit value of processing performance indicating an upper limit of a processing performance value of an information processing device including a plurality of modules, the estimation method comprising steps, which are executed by the estimation device, of:

storing a unit processing performance value for each of the modules indicating the processing performance value when one CPU core is allocated to each of the modules, an initial processing performance value indicating a minimum estimated value of the processing performance value, and a predetermined upper limit number of allocable CPU cores;

calculating a temporary processing performance value by adding a processing performance value increment indicating an increment of predetermined processing performance to the initial processing performance value, calculating a number of necessary CPU cores, which indicates the number of CPU cores necessary to satisfy the temporary processing performance value, for each of the modules using the calculated temporary processing performance value and the unit processing performance value, and calculating the total number of necessary CPU cores, which is calculated for each of the modules, as a total number of allocated CPU cores; and executing determination as to whether the calculated total number of allocated CPU cores exceeds the predetermined upper limit number of allocable CPU cores whenever the processing performance value increment is repeatedly added to the temporary processing performance value, and calculating, as the upper limit value of processing performance, the maximum temporary processing performance value at which the calculated total number of allocated CPU cores does not exceed the predetermined upper limit number of allocable CPU cores.

5. The estimation method according to claim 4, further comprising:
calculating the number of necessary CPU cores satisfying the upper limit value of processing performance for each of the modules using the upper limit value of processing performance and the unit processing performance value, and setting the calculated number of necessary CPU cores as the number of CPU cores allocated to each of the modules.

6. The estimation method according to claim 4, wherein the information processing device is an information processing device that processes communication data, and
the processing performance value indicates a number of the communication data to be processed per unit time.

* * * * *